(No Model.) 2 Sheets—Sheet 1.

L. STEVENS, E. E. ROBERTS & H. G. SEEBER.
APPARATUS FOR EXCAVATING AND SCREENING GRAVEL, &c.

No. 246,237. Patented Aug. 23, 1881.

(No Model.) 2 Sheets—Sheet 2.

L. STEVENS, E. E. ROBERTS & H. G. SEEBER.
APPARATUS FOR EXCAVATING AND SCREENING GRAVEL, &c.

No. 246,237. Patented Aug. 23, 1881.

ATTEST,
Walter W. Scott
Geo. Bainton

INVENTORS,
Lloyd Stevens,
Edward E. Roberts,
Horatio G. Seeber,
by their Attys.
Burke, Fraser & Connolly.

UNITED STATES PATENT OFFICE.

LLOYD STEVENS AND EDWARD E. ROBERTS, OF NEW YORK, AND HORATIO G. SEEBER, OF BROOKLYN, N. Y.; SAID SEEBER AND ROBERTS ASSIGNORS TO SAID STEVENS; SAID STEVENS ASSIGNOR TO LEWIS J. LYONS, OF NEWARK, N. J.

APPARATUS FOR EXCAVATING AND SCREENING GRAVEL, &c.

SPECIFICATION forming part of Letters Patent No. 246,237, dated August 23, 1881.

Application filed March 7, 1881. (No model.)

*To all whom it may concern:*

Be it known that we, LLOYD STEVENS and EDWARD E. ROBERTS, of the city, county, and State of New York, and HORATIO G. SEEBER, of Brooklyn, Kings county, New York, all citizens of the United States, have jointly invented certain Improvements in Apparatus for Excavating and Screening Gravel, &c., of which the following is a specification.

This invention relates to mechanism for excavating, elevating, and screening gravel, &c., being especially applicable to the removal of gravel, grit, &c., from beaches, the excavation being generally, but not always, carried on under water. The entire mechanism is mounted upon wheels or rollers, and may be moved from place to place or be gradually moved along as the excavation proceeds. As the excavations are made in the form of trenches arranged parallel to each other and separated by narrow "lands" the convenience of this arrangement will be apparent. The water percolates through the gravel and stands in the excavation, and the mass of gravel, sand, &c., is excavated and raised by an elevator. From the elevator-buckets it falls into the hopper of a compound rotary screen, which separates the same into coarse gravel, fine gravel, and grits, which fall into separate receivers, while the sand, clay, water, &c., forming the refuse is carried away by a conduit or trough into one of the adjacent abandoned pits or excavations. To prevent the hopper of the screen from being choked, a jet of water is forced into it by a suitable pump and fixed nozzle; and to wash the sand from the gravel and keep the meshes of the screen clear, a sprinkler is arranged over the screen, all as will be more particularly set forth.

Figure 1:
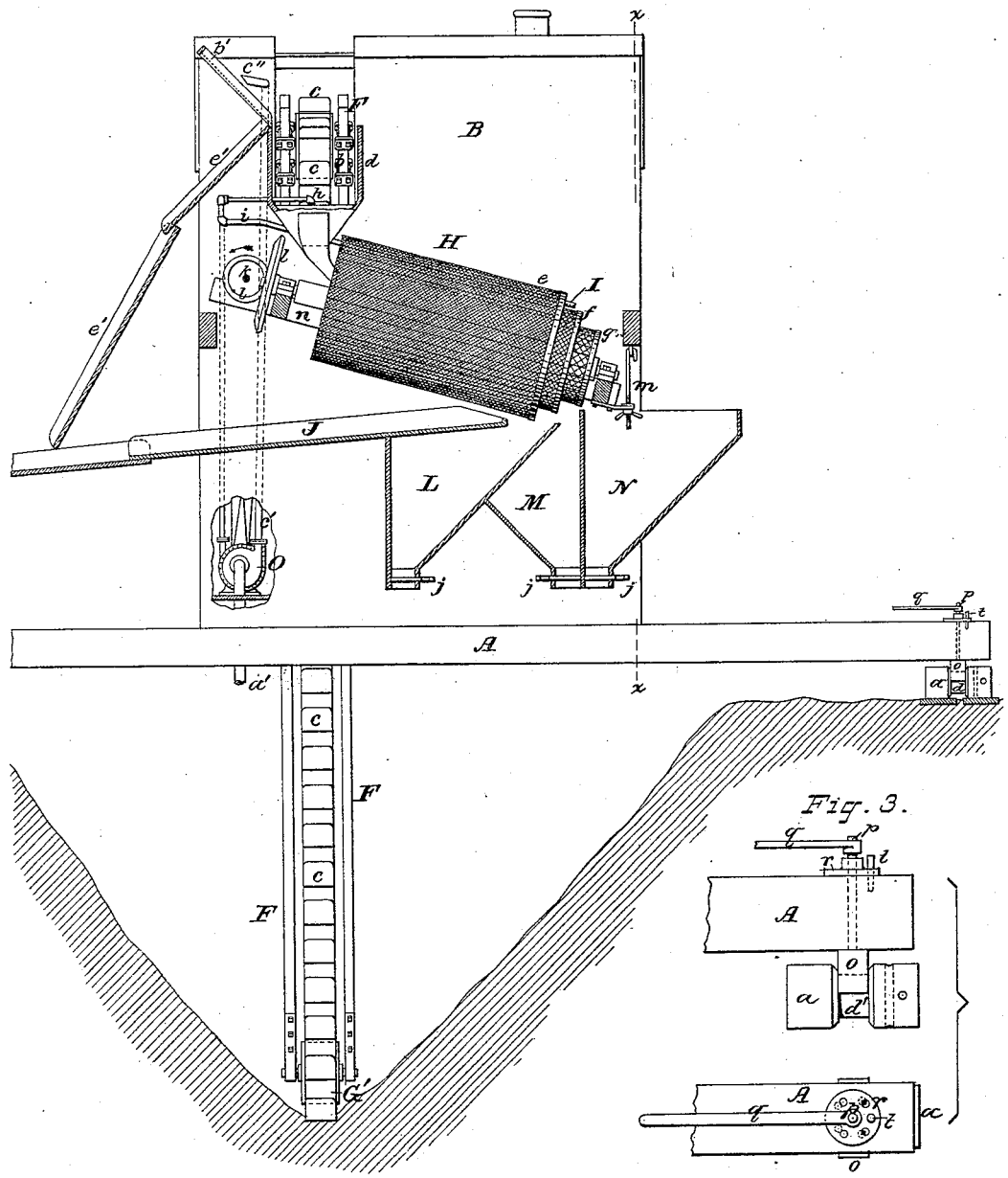
Figure 2:
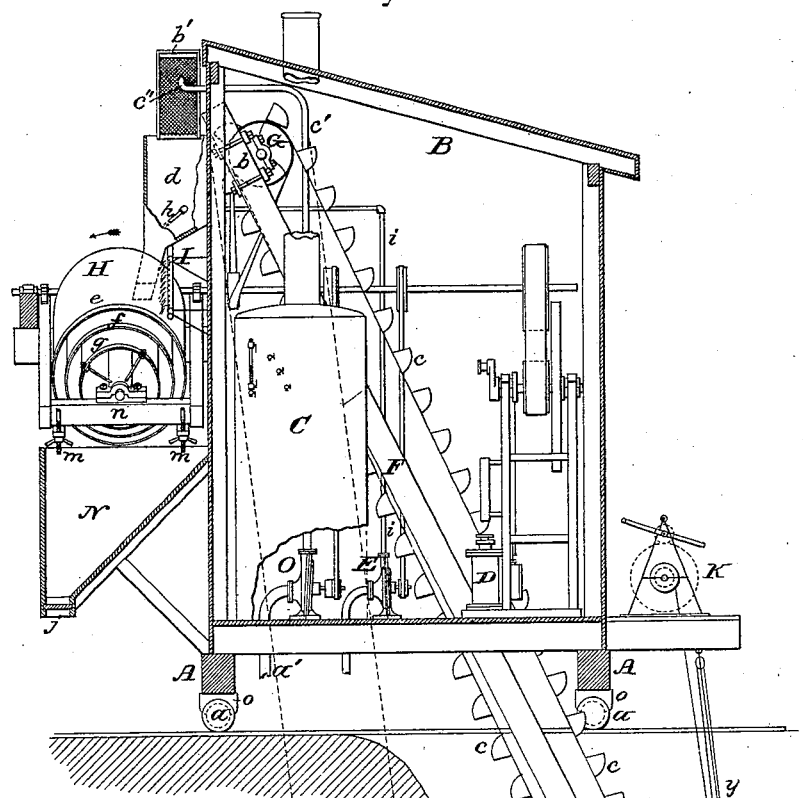
Figure 4:
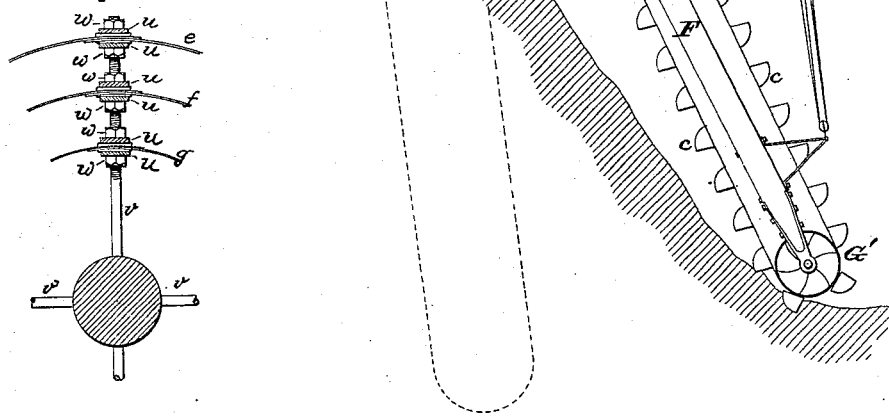

In the drawings, which serve to illustrate our invention, Figure 1 is a front elevation of the structure containing our apparatus; and Fig. 2 is a sectional elevation of the same, taken in the plane of the line $x$ $x$ in Fig. 1. Figs. 3 and 4 are detail views, on a larger scale, arranged to illustrate parts of the apparatus and their construction, which will be more particularly referred to hereinafter.

In describing our invention we will give some of the principal dimensions of the parts, so that its practical operation may be the better understood; but we do not confine ourselves to these.

Let A A represent sills, which are about thirty-five feet long and mounted on rollers $a$ $a$. These sills extend across the excavation from which the gravel is being removed.

B is a house or shelter about ten by fifteen feet in plan and about fifteen feet high. This house is mounted upon the sills A, and contains a boiler, C, an engine, D, a pump, E, (preferably centrifugal,) and an elevator. The elevator-legs F are about twenty-five feet long, and are hung on the shaft of the upper pulley, G, the said shaft having bearings in timbers forming a part of the house-frame, and also bearings $b$ $b$, adjustable along the legs for the purpose of shortening the elevator, as will be more particularly hereinafter described. The lower pulley, G', turns in fixed bearings on the legs. The buckets $c$ $c$ are made strong and durable, preferably of steel, and serve to excavate as well as elevate the gravel; and the elevator, hung to swing on the upper shaft, as shown, may be raised or lowered as required.

We may arrange the elevator at the outside of the house, but prefer to arrange it to swing in a slot or opening in the floor, as shown.

The gravel, borne up by the elevator-buckets, is deposited in a hopper, $d$, from whence it is carried into a rotary screen, designated generally by the letter H. This screen is formed of three cylinders, $e$, $f$, and $g$, of different diameters, one arranged within the other, as shown. The outer cylinder, $e$, is made of wire gauze or cloth with a mesh of sufficient size to pass sand but not grit, the next cylinder, $f$, of wire-cloth that will pass grit but not gravel—that is to say, gravel suitable for roofing. The inner cylinder, $g$, has a mesh that will pass fine gravel. The whole screen may be about nine feet long and the space between the cylinders about four inches. The cylinders vary in length, as shown, for convenience in discharging into different bins or receptacles.

Into the hopper of the screen we admit a jet of water from the pump through a nozzle, $h$, arranged by preference to discharge downward or toward the screen. This jet breaks up any lumps formed by adhesion or cohesion, and prevents the gravel, &c., from choking up the hopper. This is very important, as cohering deposits of clay and sand are sometimes found mixed with the gravel.

Over the screen is arranged a sprinkler, I, which is supplied from the pump through a pipe, *i*. This sprinkler thoroughly washes the sand from the gravel and grit in their passage through the cylinders, and permits of their delivery clean and uncontaminated. It also washes the screen and keeps its interstices open. The mass of sand, water, clay, &c., forming the refuse falls through the meshes of the outer cylinder, *e*, into a long trough, J, which conveys it off and deposits into an exhausted excavation, or to some point where it will be out of the way. The grit falls into a bin or receptacle, L, the fine gravel into a bin or receptacle, M, and the coarse gravel or residue into a bin or receptacle, N. Each of these bins has a slide or trap, *j*, in its bottom, whereby the charge therein may be dumped into a cart or conveyance backed under it, the receptacles being raised about five feet above the ground for that purpose.

For ordinary gravel we set the screen at an incline of about twelve degrees; but to adapt it to gravel containing more or less sand or clay we provide a means for adjusting it to any desired angle.

The screen is or may be rotated from a shaft, *k*, driven by the engine through the medium of bevel-gears *l*, and the opposite end of the screen-shaft is adapted to be raised or lowered by means of a screw, *m*, arranged under the free end of the frame *n* in which the screen is mounted. In lieu of this screw other equivalent means may be employed, as a rope or pulley, to adjust the angle of the screen. The more sand and clay there is mixed with the material excavated the less will be the angle of the screen, and vice versa.

Under some conditions the elevator is shortened by loosening the bearings *b b* on the legs for the upper pulley, lifting the legs, and securing said bearings at another point, the belt bearing the buckets being shortened by taking out a section thereof. The belt may be made in sections of different lengths for this purpose, and to give room for the play of the upwardly-projecting ends of the legs an opening may be made in the roofing of the house.

The elevator serves the purpose for elevating all kinds of material that may be struck in excavating; but it must be understood that beds or streaks of clay containing very little gravel are often struck, and also beds of very uniform fine and medium gravel. Such deposits may be put through the screen much more rapidly than the ordinary deposits, and much more rapidly than the elevator will lift it when running at its ordinary speed. We therefore find it very economical to employ, as an auxiliary to the elevator, a dredging-pump, O, mounted in the same structure with the other machinery, and run from the same driving-shaft as the elevator. This pump may be so arranged and provided with belts and pulleys that the elevator can be thrown out of gear and the pump into gear by means of one lever, so that when a change is to be made from one to the other it can be done instantly by one movement of the shifting-lever.

The suction-pipe *a'* of the pump O may be of the usual kind and be arranged to drop into the excavation at any time, and to be controlled from above by a rope or other suitable means; or the suction may remain in the excavation, ready for use at any time. The pump O discharges the excavated material either directly into the hopper *d* or onto a supplementary screen, *b'*, arranged to shoot the material into the said hopper. We prefer the latter arrangement, for the reason that the material usually excavated by the pump contains a large proportion of clay and sand, and these we find it better to eliminate before the material reaches the revolving screen, whereby the labor of the latter is lessened, as the pump will excavate and elevate about four times as much material in a given time as the elevator.

The eduction-pipe *c'* of the pump O is provided, by preference, with a nozzle, *c''*, through which it discharges the material onto the screen *b'*, which may have an angle of about forty-five degrees. Said nozzle may have a flexible pipe, whereby the discharged material can be directed into the hopper. The mud, sand, water, &c., which falls or is drawn through the screen *b'* may flow through a trough, *e'*, into the outfall-trough J, as shown.

It is practically impossible to excavate and elevate all kinds of material with a pump of ordinary capacity, as the larger stones will stop the suction-pipe or injure the pump. Therefore we employ the elevator for the rougher regular work and the pump for special work, as described.

In Fig. 3 we have shown a plan and elevation, on a large scale, of a roller, *a*, and its accessories. The roller has a journal, *d'*, of reduced diameter formed in it, and on this rests a saddle or bearing-cap, *o*. To prevent the shoulders formed by the junction of the larger ends of the roller with the smaller journal *d'* from binding on the cap *o*, we give said shoulders a slight bevel, as shown, which bevel extends down nearly to the journal. The cap or saddle *o* has an axis or spindle, *p*, which extends up through the sill, and is provided with a crank or arm, *q*, either fixed or removable, whereby it and the bearing-cap may be turned. To form a stop whereby the cap may be held for the time in any position to which it may be set, we provide the spindle with a disk or flange, *r*, arranged to play over the sill or a plate fixed thereon. The flange *r* has perforations in it arranged to coincide with some one of a concentric series of perforations in the plate on the sill, and when the arm is turned to the desired position with respect to the sill a pin, t, is inserted, which prevents accidental rotation of the axis. This device enables us to set the rollers a a oblique to the axis of the sill, if desired, in moving the structure from place to place. The rollers are turned by means of levers inserted in holes in the manner of a capstan.

In Fig. 4 we have shown by means of an enlarged sectional view the construction of the foraminous cylinders which form the screen H. The edges of the cylinder are brought together and overlapped, and clamping-strips u u are placed one inside and the other out. These two plates are brought firmly together on the wire-cloth by means of suitable bolts and nuts, as shown.

Radial screw-threaded arms v v, fixed in the shaft of the screen, pass through the several cylinders and the clamping-strips, (of which there are four sets, by preference, equally spaced,) and the cylinders are secured adjustable thereto by means of double nuts w w, substantially as shown, so that the distance between the cylinders may be regulated.

We are aware that a screen composed of several foraminous cylinders arranged one within another is not new, and we make no broad claim thereto, and do not confine ourselves to this form of screen. We may construct it as follows: In place of employing several cylinders, arranged one within another, we may employ one long cylinder made up of sections of foraminous material, having interstices of different sizes. This modified form of screen is only objectionable on account of its length.

In setting to work with our apparatus a hole is dug of the proper depth to admit the leg of the elevator, and the structure is set over said hole, the sills A being arranged at right angles to the axis of the proposed excavation. If necessary or desirable, plank tramways may be laid on the ground for the rollers a a to travel on as the excavation progresses. In some cases the preliminary digging may be dispensed with and the excavator be set to work at the surface. The machinery is now set in motion, and the lower or excavating end of the elevator is controlled by a winch, K, and suitable tackle, y. As the excavation proceeds the elevator may be lowered to a nearly vertical position, as indicated by dotted lines in Fig. 2. The excavated material is deposited in the central cylinder of the revolving screen, and in due course the various grades of grit, gravel, &c., pass out at the depressed end of the screen into their respective receptacles or bins. The jet of water in the screen-hopper breaks up all cohering masses and the sprinkler washes the gravel and grit clean. As the screen revolves in the direction of the arrow in Fig. 2, and the gravel is inclined to climb up on the side of the screen next to the building, we prefer to arrange the sprinkler next to that side; but this is not essential. An excess of water may be employed without detriment, if it be convenient of access. The apparatus is moved along as the excavation progresses, as will be well understood.

It will be understood that where excavating in the water my apparatus may be run upon a floating ponton or scow and be operated thereon. Under these circumstances the entire apparatus may be moved along on the scow or scows precisely as it would be moved along the beach.

Having thus described my invention, I claim—

1. The combination, to form an excavating and screening apparatus, of a structure mounted on rotative supports and containing an engine, an excavating-elevator hung on bearings in or on said structure and arranged to excavate the material, elevate it, and deliver it into a screen, the said screen mounted in bearings on said structure and arranged to be rotated and to screen the material, a pump to supply water to said screen, and suitable bins to receive the several grades from the screen and deliver them to conveyances, the whole being constructed and arranged to operate together substantially as set forth.

2. The combination, to form an excavating and screening apparatus, of a structure or platform mounted on rotative supports, an excavator and elevator, a dredging-pump, and an engine for driving said elevator and pump, mounted on said platform, a rotary screen mounted in bearings on said structure and adapted to be driven from a motor on said platform, and to receive the material excavated and elevated, and bins or receptacles, also mounted on said structure, to receive the screened material, all arranged to operate substantially as set forth.

3. The combination, with the screen mounted rotatively in a suitable frame, of the said frame hung at one end on the driving-shaft k, the said shaft, the gears l l, and the adjusting-screw m, all arranged to operate substantially as set forth.

4. The combination, with the legs of the elevator, of the upper pulley mounted rotatively in bearings in some fixed part of the structure, the lower pulley mounted rotatively in bearings in the legs, the elevator-belt made up of sections, and bearings b for the upper pulley, made adjustable on the legs, whereby the elevator may be shortened by the removal of a section of the belt and shifting said bearings to suit the reduced length of the belt, substantially as and for the purposes set forth.

In witness whereof we have hereunto signed our names in the presence of two subscribing witnesses.

LLOYD STEVENS.
EDWARD E. ROBERTS.
HORATIO G. SEEBER.

Witnesses for Stevens and Roberts:
EDGAR A. TUNELL,
WALTER W. SCOTT.

Witnesses for Seeber:
WALTER W. SCOTT,
THEO. THIELER.